(12) United States Patent
Alderman (10) Patent No.: US 6,645,598 B2
(45) Date of Patent: Nov. 11, 2003

(54) CELL INSULATION BLANKET WITH PHASE CHANGE MATERIAL, AND METHOD OF MAKING

(76) Inventor: Robert J. Alderman, 686 Highland Ter., Canyon Lake, TX (US) 78133

(*) Notice: Subject to any disclaimer, the term of this patent is extended or adjusted under 35 U.S.C. 154(b) by 0 days.

(21) Appl. No.: 10/103,636

(22) Filed: Mar. 21, 2002

(65) Prior Publication Data
US 2003/0129330 A1 Jul. 10, 2003

Related U.S. Application Data

(63) Continuation-in-part of application No. 10/056,730, filed on Jan. 25, 2002
(60) Provisional application No. 60/345,770, filed on Jan. 4, 2002.

(51) Int. Cl.[7] .................................................. B32B 1/06
(52) U.S. Cl. .......................... 428/69; 428/72; 428/76; 428/195; 428/198; 52/406.2; 52/406.3; 52/407.5; 126/618; 165/46
(58) Field of Search ........................ 428/72, 76, 198, 428/69, 195; 126/618; 165/46; 52/406.1, 406.2, 406.3, 407.5

(56) References Cited

U.S. PATENT DOCUMENTS

| | | | |
|---|---|---|---|
| ,907,099 A | * | 12/1908 | Trowbridge |
| 2,876,634 A | * | 3/1959 | Zimmerman et al. .......... 62/457 |
| 3,148,676 A | * | 9/1964 | Truog et al. ................. 126/246 |
| 3,463,140 A | * | 8/1969 | Rollor, Jr. ................... 126/246 |
| 4,253,983 A | * | 3/1981 | Blanie ........................... 252/70 |
| 4,856,294 A | * | 8/1989 | Scaringe et al. ............ 62/259.3 |
| 4,931,333 A | * | 6/1990 | Henry ........................... 428/76 |
| 5,233,840 A | * | 8/1993 | Scaringe ........................ 62/77 |
| 5,270,092 A | * | 12/1993 | Griffith et al. ................. 428/69 |
| 5,290,904 A | * | 3/1994 | Colvin et al. .................. 428/68 |
| 5,491,952 A | | 2/1996 | Alderman et al. ......... 52/749.12 |
| 5,561,959 A | | 10/1996 | Alderman et al. .......... 52/407.3 |
| 5,626,936 A | * | 5/1997 | Alderman ...................... 428/68 |
| 5,770,295 A | | 6/1998 | Alderman ...................... 428/68 |
| 5,918,436 A | * | 7/1999 | Alderman ................... 52/407.3 |

OTHER PUBLICATIONS

Mohammed M. Farid and Atsushi Kanzawa, "Thermal Performance of a Heat Storage Module Using PCM's With Different Meltin Temperatures: Mathematical Modeling," Transactions of the ASME, vol. 111, May 1989, pp. 152–157.*
Richard Stepler, "Solar Salts—New Chemical Systems Store the Sun's Heat", Mar. 1980, 2 pages.*
John O'C. Young, "Phase Change Materials as Energy Storage Media" Sunworld, vol. 6, No. 6, 12/1982, pp. 169–171.*
David Eissenberg and Charles Wyman, "What's in Store for Phase Change?" 5 pages, May 1980.*
David Scott, "Solar–Heat Storage System," Mar. 1982, 5 pages.*

* cited by examiner

Primary Examiner—Alexander S. Thomas
(74) Attorney, Agent, or Firm—Thomas, Kayden, Horstemeyer & Risley (57) ABSTRACT

Heat insulation blanket (10) includes a layer of inner cells (16) containing a phase change material, and opposed outer cells (18 and 19) containing dead air or other undisturbed gas. When placed in an attic or other insulated area, the phase change material changes phase when the outside atmospheric temperature passes the phase change temperature, resulting in a delay in the transfer of heat between the interior space and the atmosphere because of the heat required for or given up by the PCM during its change of phase. The outer plies of sheet material that form the superposed cells of the cell blanket are formed with a coating of heat reflective material that faces the interior of the cell blanket, whereby the reflective surfaces are protected against deterioration and retain their capacity to reflect radiant heat.

12 Claims, 5 Drawing Sheets

CELL INSULATION BLANKET WITH PHASE CHANGE MATERIAL, AND METHOD OF MAKING

CROSS REFERENCE TO RELATED APPLICATION

This is a continuation-in-part of U.S. patent application Ser. No. 10/056,730, filed Jan. 25, 2002, entitled "Reflective Heat Insulation." Also, applicant claims the benefit of U.S. patent application serial No. 60/345,770, entitled "Blanket Insulation with Reflective Sheet and Air Space," filed in the U.S. Patent and Trademark Office on Jan. 4, 2002.

FIELD OF THE INVENTION

This invention involves heat insulation for building structures whereby the walls, roof, ceiling, floors and other partitions of the building are insulated with flexible sheets of heat insulation material. More particularly, this invention involves heat insulation material that utilizes, in various combinations, phase change material, heat reflective material, dead air space, and fibrous blanket material, for use alone or in combination with other heat insulation materials in a building structure, to retard the transfer of heat between adjacent spaces about a building structure. Also, the method of making cell blanket heat insulation with a layer of phase change material is disclosed.

BACKGROUND OF THE INVENTION

Heat insulation material placed in walls, ceilings, roofs, floors and other areas about a building typically comprise fibrous blanket insulation, such as elongated blankets formed of fiberglass. The principle of the blanket insulation is to form dead air spaces that provide insulation against convection and conduction heat transfer. The blanket insulation can be formed in small "clumps" and blown into spaces such as into the attics of residential homes and other areas about building structures, and also can be made into elongated blankets formed in a specific width and thickness that are suitable for placement between parallel joists, studs, rafters, purlins and other parallel support structures that are uniformly spaced apart. The elongated blanket, such as a fiberglass blanket, usually is supplied in reels and is cut to the desired length at the job site for placement between the parallel structures.

Fiberglass is one of the more desirable materials for forming blanket insulation because it holds its shape and traps a substantial amount of air between its fibers to form the dead air spaces. However, the fiberglass alone does not provide adequate heat insulation against radiant heat transfer.

In the recent past, an additional sheet of radiant heat reflective material has been applied in building structures, sometimes in combination with other materials such as blanket material. The reflective material, such as aluminum foil, functions as a reflective surface for reflecting radiant heat, thereby functioning as a barrier to radiant heat transfer, and enhancing the insulation capabilities of the other heat insulation materials.

One of the problems with the above noted heat reflective insulation is that when reflective surfaces of the heat reflective foil engage another surface, such as an adjacent layer of insulation material or the structure of the building, the foil loses at least some of its ability to reflect heat. A space, such as a dead air space, must be maintained adjacent the foil in order for the foil to function as an effective heat reflector.

Another problem with the use of reflective surfaces in combination with other insulation materials for heat insulation is that if the surface of the reflective sheet material should become dirty from an accumulation of dust, trash, fibers, vapor, etc., the reflective sheet loses its ability to reflect radiant heat, and therefore loses its insulation value.

Another insulation innovation that has been developed in the recent past is the use of phase change material ("PCM") in combination with other insulation materials. The PCM loses heat when it changes phase from a liquid to a solid and absorbs heat when it changes phase from a solid to a liquid. These changes of phase occur at a substantially constant temperature for the PCM. The net result is that when the PCM is used in a roof structure, for example, and the outside temperature begins to rise to a level higher than the phase change temperature, the PCM will remain at its phase change temperature as the PCM changes phase from a solid to a liquid. In the meantime, the PCM absorbs heat from the outside, warmer atmosphere without changing its own temperature or influencing a change of temperature in the inside atmosphere of the building structure. This effectively delays the transfer of heat from outside to inside of the building structure, reducing the load to be carried by the conventional air conditioning system of the building structure.

Likewise, the reverse is true when the outside temperature becomes lower than the phase change temperature of the PCM. The PCM begins to change phase from liquid to solid at a substantially constant temperature, gradually giving up its heat to the outside, cooler atmosphere, thereby delaying the transfer of heat from the warm interior of the building to the cooler outside atmosphere.

The use of PCM as an insulator for building structures is disclosed in U.S. Pat. No. 5,626,936, which is incorporated herein by reference.

Although the use of PCM has been disclosed in the prior art as being used as an insulator for building structures, the production and installation of insulators that include PCM is still somewhat expensive and not appreciated by most in the industry.

It is to these problems that this invention is addressed.

SUMMARY OF THE INVENTION

Briefly described, the present invention comprises an improved heat insulation assembly for placement in and for becoming a part of a building structure, for insulating the structure from conduction, convection and radiation heat transfer through the wall structures of the building. This includes vertical walls, ceilings, roofs, floors, and other partitions that separate the interior temperature controlled spaces from outside uncontrolled temperature spaces, generally referred to herein as "wall structures."

In the disclosed embodiments, radiant heat insulation is used, either alone or in combination with other types of heat insulation. Also, phase change material ("PCM") is used in combination with other heat insulation materials.

The radiant heat insulation includes heat reflective sheet material, such as radiant heat reflective metal foil, radiant heat reflective metalized plastic sheet material, and plastic material coated with reflective substances such as metal. More specifically, the reflective material can be formed of the group consisting essentially of metalized polyester, metalized polyethylene, metalized polyvinyl chloride, and metalized polypropylene. Typically, foil and other radiant heat reflective sheet materials are silver in color, or other efficient radiant heat reflective colors. The reflective surface of the sheet is maintained in a spaced relationship with respect to the next adjacent structure, and is enclosed in a space that protects the reflective surfaces of the reflective sheet from the accumulation of dirt, dust, insulation fibers, vapor and other things that are likely to occlude or diminish the reflective properties of the reflective surface of the reflective sheet.

In addition to reflective insulation, the invention includes use of phase change material in combination with the reflective material. Phase change material can be any material that changes between a liquid state and a solid state in response to the change in temperature, when the temperature rises across the phase change temperature of the PCM or decreases from a level higher than to a level lower than the phase change temperature of the PCM. PCM suitable for use can include calcium chloride hexahydrate, sodium sulfate, paraffin, $Na_2SO_4.10H_2O$, $CaCl_2.6H_2O$, $NaHPO_4.12H_2O$, $Na_2S_2O_3.5H_2O$, and $NaCO_3.10H_2O$.

An example of the use of PCM as a heat insulator is when the PCM is placed in an exterior wall or attic of a building and the outside temperature rises from a level substantially lower than the phase change temperature of the PCM to a level substantially higher than the phase change temperature of the PCM. As the temperature exceeds the phase change temperature of the PCM, the PCM remains at the same temperature as it absorbs heat that causes the PCM to change phase from solid to liquid. This has the effect of delaying the transfer of heat from the warmer atmosphere to the cooler interior of the building.

In the reverse situation, the outside temperature decreases from substantially higher than to a level substantially lower than the phase change temperature of the PCM, and as the PCM is cooled, it gives up heat in response to its changing of phase from liquid to solid. Again, this delays the transfer of heat emitted from the interior of the building to the cooler atmosphere.

This invention includes a combination of heat reflective insulation and phase change insulation in the form of a cell blanket, whereby superposed cells of phase change material and of dead air space are formed by overlying sheets that include a surface of radiant heat reflective material, such as aluminum foil.

In one embodiment of the invention, the cell blanket is formed with an inner layer of PCM cells and opposed outer layers of dead air cells, with the dead air cells and the overlying sheets that form the cells providing both protection for the PCM cells and protection for the radiant heat reflective surfaces, so as to avoid occlusion of the reflectivity of the heat reflective surfaces.

Other arrangements of the cell blanket can be utilized, such as only a single layer of dead air cells adjacent a single layer of PCM cells, and other combinations of superposed PCM cells and dead air cells including the heat reflective surfaces.

The cell blanket described above can be used alone or in combination with various other insulation structures, such as gypsum board, fibrous blanket insulation, between the purlins of an industrial building, in new construction, and in old construction so as to supplement the previously applied or substitute for the previously applied insulations.

The cell blanket is formed in a continuous process by advancing multiple plies of sheet material into superposed relationship along a processing path with the plies of sheet material including a pair of juxtaposed inner sheets and a pair of outer sheets, with the inner sheets positioned between the outer sheets. The sheets are progressively connected together with a plurality of parallel seams in the sheets that extend along the processing path. The connection of the sheets can be made by the application of heated rollers against the superposed sheets, which fuses seams in the sheets that extend longitudinally of the path along which the sheets are advanced. The progressive connection of the four sheets forms inner channels between the inner sheets and outer channels positioned on the opposite sides of the inner channels. As the inner channels are formed, they are filled with phase change material, preferably in the liquid state. As the inner channels are filled with phase change material, the outer channels that straddle the inner channels are filled with gas, preferably air. Once the channels have been filled with PCM and gas, the work product is passed adjacent laterally extending rolls that divide the channels into discrete cells, forming an array of cells, with the cells filled with phase change material positioned between the cells filled with gas. This completes the formation of the cell blanket, by which layers of cells are formed, with at least one layer of cells including a PCM and other layers of cells being filled with gas. The radiant heat reflective surfaces of the sheets of material that form the cell blanket are positioned adjacent the dead air cells, and the space occupied by the dead air protects the reflective surfaces from the accumulation of dust, dirt, fiber, or moisture, and from engagement with other surfaces so as to avoid occlusion or deterioration of the reflective surfaces of the sheet. This tends to prolong the reflective life of the sheet material and, therefore, the capacity to function as radiant heat insulation.

Another feature of the invention is that the superposed layers of sheet material that form the cell blanket have a continuous coating of heat reflective material, so that the array of cells that extends across the length and breadth of a cell blanket form a substantially continuous layer of radiant heat reflective sheet material about the length and breadth of the blanket.

Preferably, the heat fused seams formed in the cell blanket that divide the cells from one another are relatively thin when compared with the length and width of the cells, providing a relatively large cell area in comparison with the area occupied by the seams between the cells.

In addition to the insulation offered by reflective sheet material and the PCM, the sheets that form the cells and the gas within then cells provide both convective and conductive heat insulation.

Preferably, the cell blanket is formed of support sheets that are of heat fusible material, such as polyester and polypropylene. In situations where the fusion of the layers of sheet material is not practical, adhesive bonding of the seams is possible.

Thus, it is an object of this invention to provide an improved heat insulation blanket for use in insulating adjacent spaces from each other, which includes layers of superposed cells, with the different layers of cells containing different insulation materials.

Another object of this invention is to provide an improved cell blanket for use in insulating wall structures and the like, and which includes layers of arrays of cells, with one layer of cells including a phase change material and another layer of cells including a different insulation material.

Another object of this invention is to provide an improved cell blanket for insulating wall structures and the like of a building, which includes superposed layers of cells, with one layer of cells including heat reflective sheet material facing a dead air space, and another layer of cells including another heat insulation material.

Another object of the invention is to provide a cell blanket that includes phase change material and heat reflective material, with both the phase change material and the heat reflective material being protected from contact by other objects.

Another object of this invention is to provide a method for expediently and inexpensively producing the cell blankets described herein.

Other objects, features and advantages of the present invention will become apparent upon reading the following specification, when taken in conjunction with the accompanying drawings.

DETAILED DESCRIPTION

Figure 1:
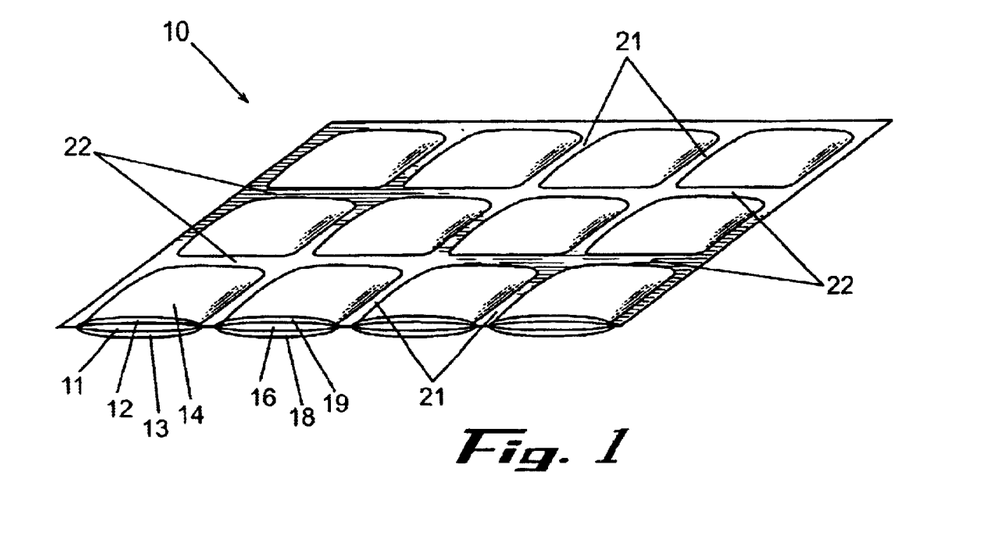
FIG. 1 is a perspective illustration of the cell blanket.

Referring now in more detail to the drawings, in which like numerals indicate like parts throughout the several views, FIG. 1 illustrates the heat insulation blanket 10 that is employed for reducing heat transfer between adjacent spaces about a building structure. The heat insulation blanket, hereinafter referred to sometimes as the "cell blanket" includes, in this embodiment, a pair of superposed inner sheets 11 and 12 and a pair of superposed outer sheets 13 and 14. The inner sheets 11 and 12 are positioned between the pair of outer sheets. The inner sheets 11 and 12 are bonded together and form inner cells 16, and the outer sheets 13 and 14 are bonded to the inner sheets 11 and 12, respectively, forming the outer cells 18 and 19.

Figure 2:
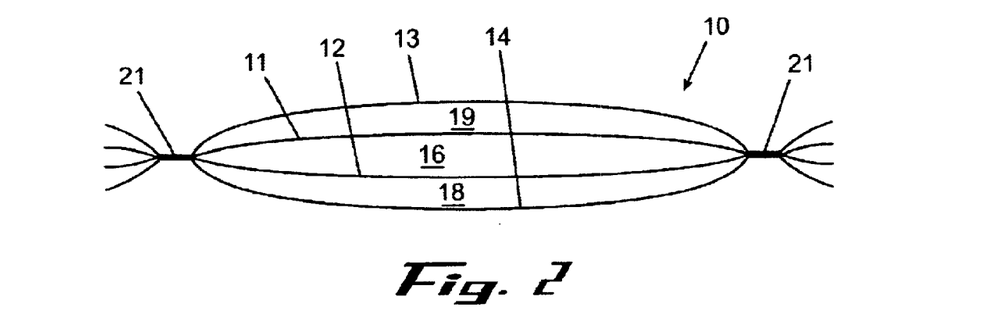
FIG. 2 is a side cross sectional view of one of the cells of the cell blanket of FIG. 1.
Figure 3:
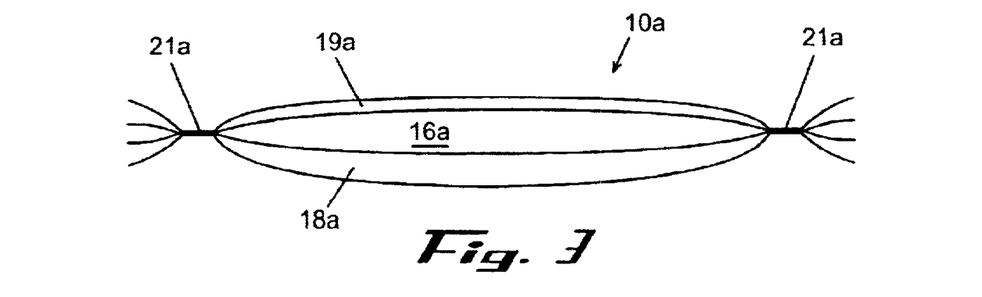
FIG. 3 is a side cross sectional view, similar to FIG. 2, but showing a cell of different configuration.

The material that makes up the superposed sheets or plies is formed of thermoplastic material, such as polyethylene or polypropylene, which can be fused at elevated temperatures. As shown in FIGS. 1–3, the cells of the cell blanket are formed in an array, with adjacent cells being divided from one another by intervening longitudinal heat fused seams 21 intersected by lateral heat fused seams 22. With this arrangement, all of the plies of the cell blanket can have the same length and breadth, and the cells are formed by heat fusing all the plies together, as illustrated.

In the embodiment shown in FIGS. 1 and 2, the outer cells 18 and 19 are of substantially equal volume and thickness, whereas in the embodiment shown in FIG. 3, the outer cell 19A is thinner and of less volume than the opposed outer cell 18A. With this arrangement, the smaller dead air of cell 19A permits more rapid heat transfer through cell 19A than through cell 18A. This means that the atmosphere adjacent thinner cell 19A has more potential influence on the inner cell 16A than the atmosphere adjacent larger outer cell 18A. Because of this dissimilarity in the rate of heat transfer across cells 19A and 18A, cell 19A will be placed adjacent the external environment of the building structure where the temperature change usually is greater than the temperature change of the interior environment. Therefore, the insulation substance in cell 16A is more likely to respond first to the temperature adjacent outer cell 19A than to inner cell 18A.

Inner cells 16 of the cell blanket 10 are filled with PCM, such as calcium chloride hexahydrate, sodium sulfate, paraffin, $Na_2SO_4.10H_2O$, $CaCl_26H_2O$, $Na_2S_2O_3.5H_2O$, $NaCO_3.10H_2O$, $NaHPO_4.12H_2O$. Outer cells 18 and 19 are filled with gas, usually air, which is the least expensive. Other gases that can be used in the cells 18 and 19 are Argon, Freon, Nitrogen, Carbon Dioxide, Krypton, and Xenon.

Figure 4:
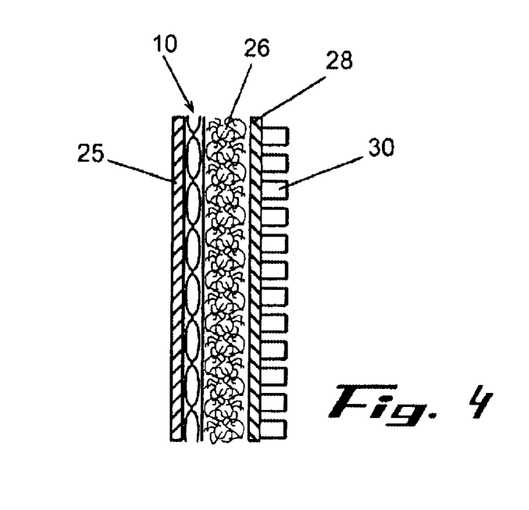
FIG. 4 is a side elevational view, in cross section, of a wall structure that includes the cell blanket of FIG. 1, together with other insulation materials.

FIGS. 4–7 show examples of different environments in which the cell blanket of FIG. 1 can be utilized. Specifically, FIG. 4 shows the cell blanket 10 positioned adjacent the interior gypsum board 25 of a building, and on the other side adjacent fiberglass blanket 26. The blanket is positioned adjacent the exterior plywood or other structural sheet 28 and the exterior of the building would include a facade 30 formed of brick, etc. The cell blanket 10 of FIG. 4 is similar to that disclosed in FIGS. 1 and 2 of the drawing. Typically, the cell blanket 10 will be adhesively mounted to a facing sheet of the fiberglass blanket 26. However, the cell blanket 10 can be attached with staples or other fasteners to hard surfaces such as the vertically extending studs (not shown in FIG. 4) of the wall structure, by inserting the fasteners through the seams 21, 22 of the blanket, so as to not puncture the cells of the blanket. In those instances where the fasteners must be inserted through the cells, it will be noted that a single fastener would rupture only a single laminate of cells, so that the adjacent cells would remain in their preferred heat insulation condition.

Figure 5:
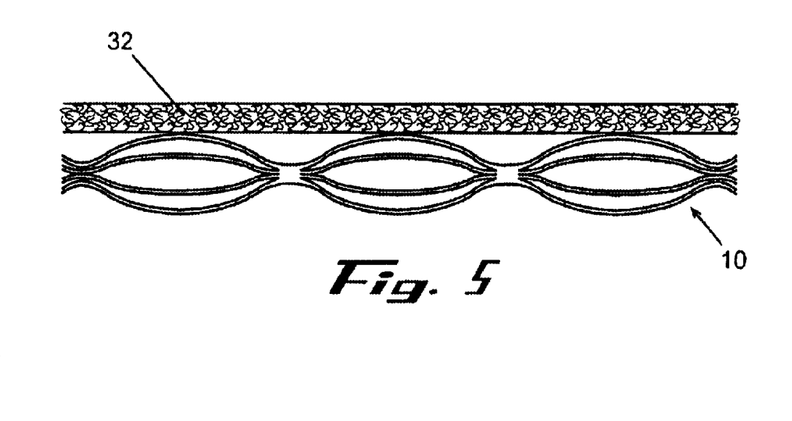
FIG. 5 is a cross sectional view of the combination of the cell blanket of FIG. 1 and gypsum board.

FIG. 5 of the drawing illustrates that the cell blanket 10 can be adhered to an adjacent board 32, such as gypsum board, again either with adhesive as illustrated or with fasteners, as may be desired.

Figure 6:
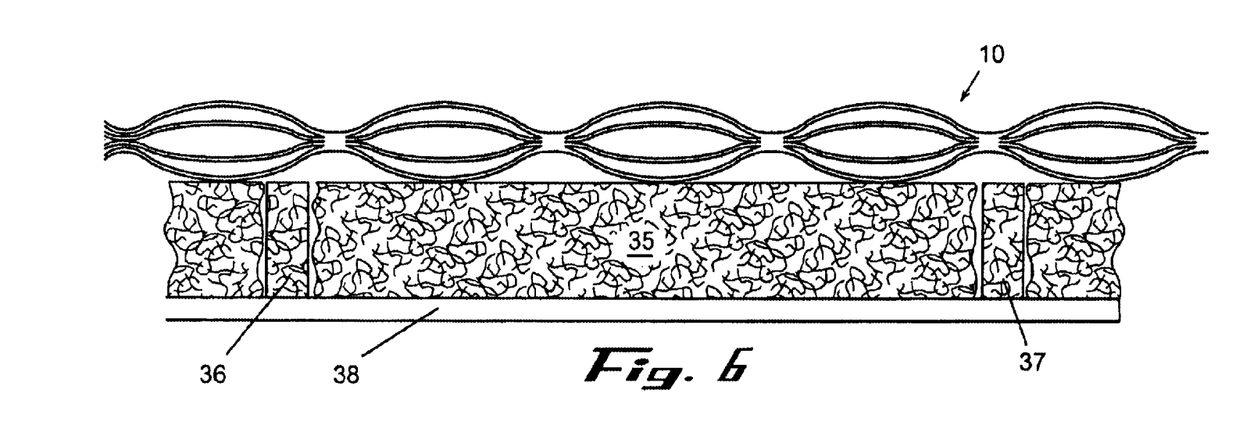
FIG. 6 is a cross sectional view of an insulated ceiling, showing the cell blanket applied on top of blanket insulation.

FIG. 6 illustrates the cell blanket 10 placed in the attic of a building structure, where fiberglass blanket 35 is positioned between adjacent joists 36 and 37 on top of the ceiling board 38. The cell blanket 10 can be placed in this position during original construction or as supplemental insulation installed after the building has been occupied.

Figure 7:
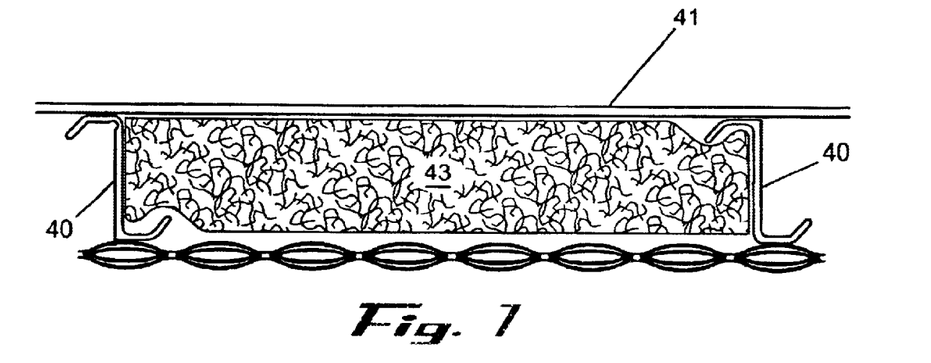
FIG. 7 is a cross sectional view of a roof structure of an industrial building, showing the cell blanket applied beneath a fiberglass blanket to the purlins of the structure.

FIG. 7 illustrates the cell blanket 10 applied to the roof structure of an industrial building. The industrial building includes parallel purlins 40, and hard panels of roofing material 41 applied to the purlins. Blanket insulation 43 is positioned between adjacent ones of the purlins 40, and the cell blanket 10 is applied to the purlins beneath the insulation blanket.

The sheet material, or plies, that form the cells of the cell blanket 10 preferably are formed of polyester, polyethylene, polyvinylchloride, polypropylene and other conventional materials that can bear a metalized coating to form a reflective surface. The metalized surface, or laminate, can be applied to one side or to both sides of the sheet material so that both sides are heat reflective.

Figure 8:
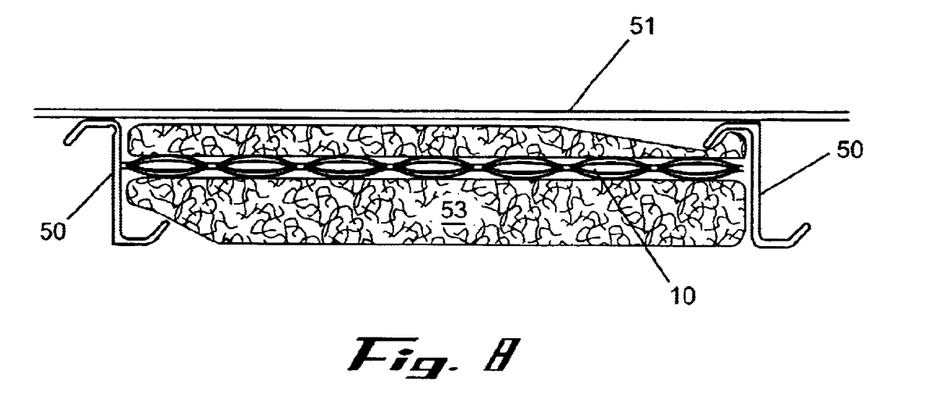
FIG. 8 is a cross sectional view of a roof structure of an industrial building, showing the heat insulation blanket placed between adjacent layers of fiberglass blanket insulation.

FIG. 8 discloses a roof structure of an industrial building which includes adjacent purlins 50 with roof panels 51 applied thereto. Cell blanket 10 is positioned between adjacent fiberglass blankets 52 and 53.

It usually is desirable to have the PCM respond to the temperature of the environment as opposed to the inside controlled temperature of the building structure. Accordingly, to assure that the outside temperature reaches the PCM and that the PCM responds to the outside temperature, the value of heat insulation between the PCM and the outside environment should be less than the value of the insulation between the PCM and the inside environment. In those instances where the phase change temperature of the PCM is relatively close to the anticipated controlled temperature of the interior of the building structure, it might not be required to have a lower insulation value between the PCM and the outside temperature. This arrangement might depend upon the anticipated differences between the high temperature and the phase change temperature, and the low temperature and the phase change temperature.

In those instances where it is desirable to have less insulation value between the PCM and the outside environment, either the cell blanket of FIG. 3 can be utilized, or the cell blanket of FIG. 2 can be utilized with other layers of insulation, such as shown in FIG. 8. FIG. 8 illustrates the upper fiberglass blanket 52 being thinner than, and therefore offering less insulation value than, the lower or interior blanket 53.

Figure 9:
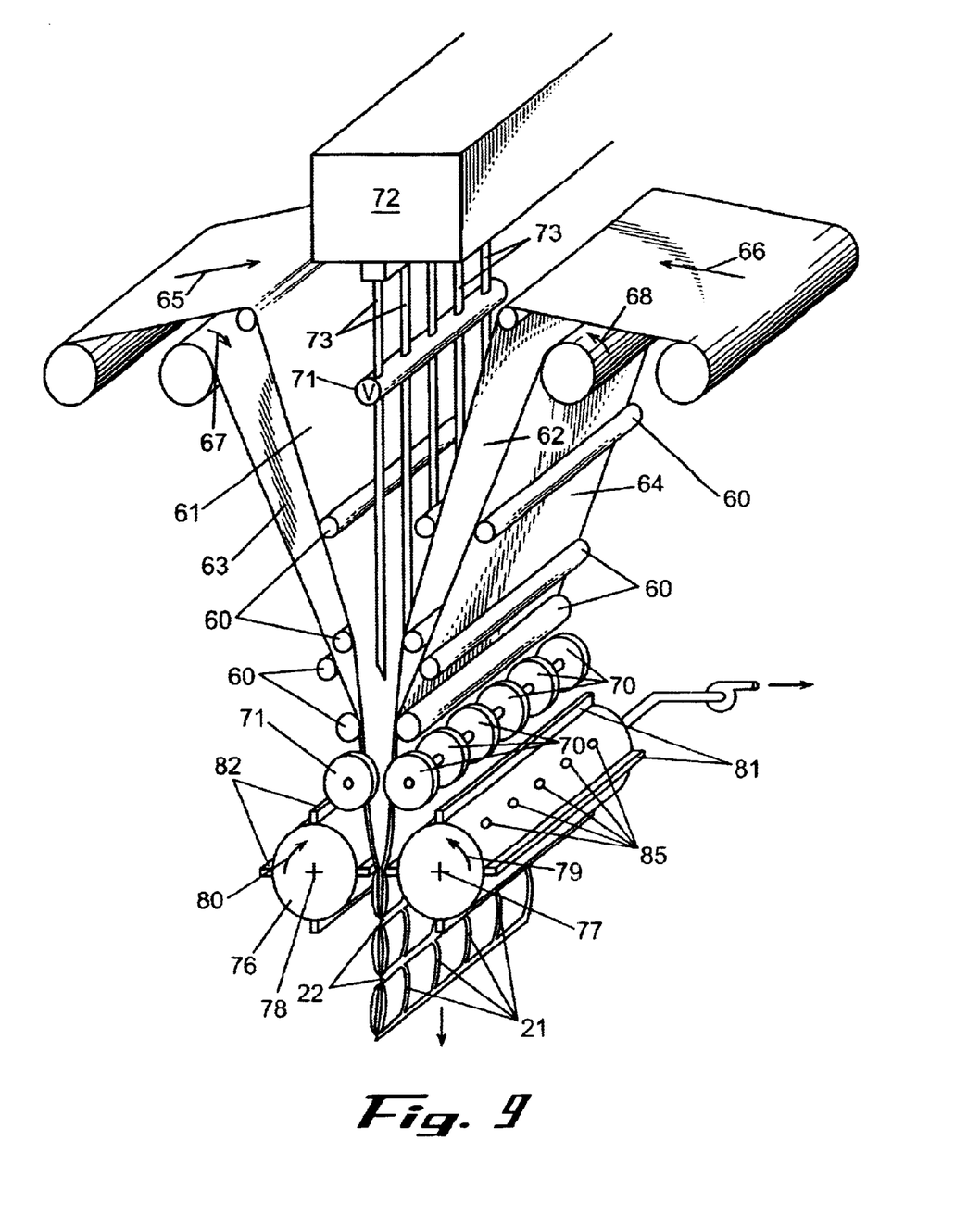
FIG. 9 is a perspective illustration, showing how the cell blanket is produced.
Figure 10:
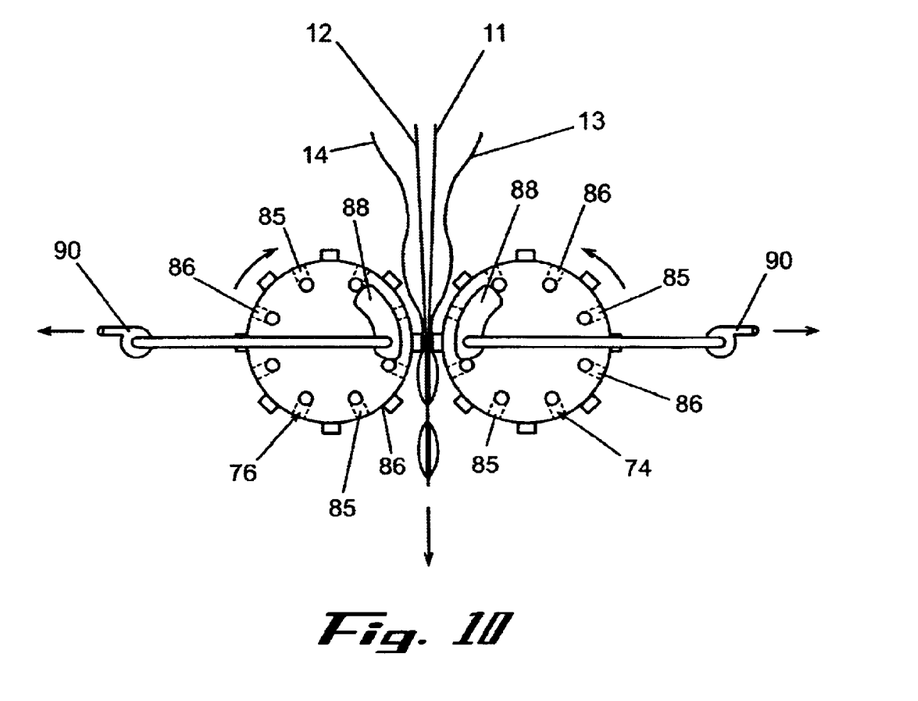
FIG. 10 is a schematic illustration of how the cells are closed after having been filled with PCM and gas.

FIG. 9 illustrates the process by which the cell blanket 10 can be produced. Multiple sheets or plies 61, 62, 63 and 64 are fed from their supplies and are advanced along a processing path in a downward direction as indicated by arrows 65–68, respectively. Various guide rolls guide the sheets until they pass in superposed relationship between opposed gangs of longitudinal heated sealing wheels 70 and 71. The wheels of the gang 70 are urged toward the wheels of the gang 71, with the superposed plies of sheet material passing between the wheels. As the wheels make contact with the superposed plies of sheet material, they heat and fuse the sheet material, forming the longitudinal seams 21 in the sheets. This causes the formation of longitudinal pockets in the superposed sheets.

In the meantime, laterally extending sealing drums 74 and 76 are rotatable about their laterally extending axes 77 and 78 in the directions as indicated by arrows 79 and 80, and the laterally extending ribs 81 of the sealing drum 74 register with the laterally extending ribs 82 of the sealing drum 76. The sealing drums 74 and 76 are heated, and their ribs are heated, to a temperature that causes the superposed sheets advancing along the processing path to fuse in response to the contact of the ribs 81 and 82. This forms the lateral seams 22 in the superposed sheets, closing the pouches into cells, as best illustrated in FIGS. 1, 2, 9 and 10.

In the meantime, the laterally extending sealing drums 74 and 76 each include surface ports 85 that communicate with internal, longitudinally extending conduits 86 (FIG. 10), with the internal conduits opening through one end of each of the sealing drums 74, 76. A vacuum shoe 88 is applied to the end of each sealing drum, and each vacuum shoe 88 is in communication with inlet of a blower 90 that draws air through the vacuum shoe and through the internal conduits 86 and surface ports 85 that register with the vacuum shoe. This induces an area of low pressure adjacent the surface of the laterally extending sealing drums, adjacent the superposed outer plies 13 and 14, causing the outer plies to be moved away from the inner plies 11 and 12. This lateral movement draws gas in between the outer plies and the inner plies, so that when the sealing drums fuse the superposed sheets together, dead air space will be formed between the outer plies and their respective inner plies, as illustrated in FIGS. 1 and 2. The gas that fills the dead air space will be air unless another gas is supplied at the area between the outer plies an the inner plies.

It will be noted that when the manufacture of the cell blanket has been completed, the inner cells 16 will be completely enclosed within the outer cells 18 and 19, so that the inner cells are completely sealed from and shielded by the outer cells. Likewise, the dead air spaces or cells between the inner and outer plies protect the facing surfaces of the sheet material from obstruction by other objects, and from the accumulation of dirt, dust, fibers, vapor or other items that might tend to diminish the reflectivity of the sheet material. Thus, the heat reflectivity capacity of the sheets 11–14 that make up the cell blanket is preserved.

If desired, less than all of the sheets can bear a heat reflective surface. For example, the outer surfaces of the pair of inner sheets 11 and 12 can bear the reflective surfaces while the surfaces of the outer sheets 13 and 14 can be translucent.

The PCM is dispensed from a container 72 through conduits 73 downwardly through a control valve 71 and moves by gravity into the pouches formed by the longitudinal heated sealing wheels 70. The PCM can be dispensed in either liquid or solid form, with liquid form preferred. Dispensing the PCM in liquid form is more likely to result in better control of the volume of PCM dispensed, and it is desirable to be able to adjust the volume of PCM being dispensed into the cells to vary the thickness of the cells or to dispense to larger or smaller cells, or to adjust for expansion and contraction of the PCM that is likely to occur during its change of phase.

Although preferred embodiments of the invention have been disclosed in detail herein, it will be obvious to those skilled in the art that variations and modifications of the disclosed embodiments can be made without departing from the spirit and scope of the invention as set forth in the following claims.

I claim:

1. A heat insulation blanket for reducing heat transfer between adjacent spaces, comprising:

four plies of thermoplastic sheet material in superposed relationship, including a pair of outer plies and a pair of inner plies, said inner plies positioned between said pair of outer plies, thermally formed heat seals formed in a lattice connecting all of said plies of sheet material in an array of sealed cells, said pair of inner plies and said heat seals forming inner cells between said pair of inner plies, each of said outer plies forming outer cells with one of said inner plies, said inner cells filled with phase change material, and said outer cells filled with gas.

2. The heat insulation blanket of claim 1, wherein:

at least one ply of said sheet material is formed of heat reflective material.

3. The heat insulation blanket of claim 1, wherein:

said outer cells include a first array of cells on one side of said inner cells and a second array of cells on the other side of said inner cells, and said cells of said first and second arrays of cells are substantially equal in volume.

4. The heat insulation blanket of claim 1, wherein:

said outer cells include a first array of cells on one side of said inner cells and a second array of cells on the other side of said inner cells, and the cells of said first array of cells being of larger volume than the volume of said cells of said second array of cells.

5. The heat insulation blanket of claim 1, wherein said phase change material is selected from the group consisting essentially of: calcium chloride hexahydrate, sodium sulfate, paraffin, $Na_2SO_4.10H_2O$, $CaCl_2.6H_2O$, $Na_2S_2O_3.5H_2O$, $NaCO_3.10H_2O$, $NaHPO_4.12H_2O$.

6. The heat insulation blanket of claim 1, wherein said gas is selected from the group consisting essentially of: air, carbon dioxide, nitrogen, argon, Freon, krypton, and xenon.

7. A heat insulation blanket for reducing heat transfer between adjacent areas comprising:
   at least three sheets of material positioned in adjacent superposed relationship, a lattice of seams connecting adjacent sheets of said material and forming multiple layers of superposed sealed cells between adjacent ones of said sheets,
   at least one of said multiple layers of sealed cells containing phase change material, and another one of the multiple layers of sealed cells containing a gas.

8. The heat insulation blanket of claim 7, wherein said gas is selected from the group consisting essentially of: air, nitrogen, carbon dioxide, argon, and Freon.

9. The heat insulation blanket of claim 7, wherein said phase change material is selected from the group consisting essentially of: $Na_2SO_4.10H_2O$, $CaCl_2.6H_2O$, $Na_2S_2O_3.5H_2O$, $NaCO_3.10H_2O$, $NaHPO_4.12H_2O$.

10. A heat insulation blanket for reducing heat transfer between adjacent surfaces, comprising:
    a plurality of superposed plies of sheet material,
    said plies of sheet material connected together with a lattice of seams forming layers of cells between said plies,
    one layer of said cells containing phase change material, and
    another layer of cells containing heat reflective material.

11. The heat insulation blanket of claim 10, wherein said another layer of cells includes a gas filled space adjacent said heat reflective material.

12. The heat insulation blanket of claim 10, wherein:
    said plurality of superposed plies of sheet material include at least four plies of sheet material,
    said layer of cells containing heat reflective material includes cells positioned on opposite sides of said cells containing phase change material.

* * * * *